UNITED STATES PATENT OFFICE.

WALTER GLAESER, OF BROOKLYN, NEW YORK, ASSIGNOR TO GEORGE T. BISHOP, OF MACEDONIA, OHIO.

PROCESS FOR TREATING FELDSPAR, FELDSPATHIC ROCK, AND SIMILAR MATERIAL.

1,239,787.  Specification of Letters Patent.  Patented Sept. 11, 1917.

No Drawing.  Application filed September 16, 1914.  Serial No. 862,058.

*To all whom it may concern:*

Be it known that I, WALTER GLAESER, a subject of the German Emperor, and a resident of the city of New York, borough of Brooklyn, in the county of Kings and State of New York, have invented a new and Improved Process for Treating Feldspar, Feldspathic Rock, and Similar Material, of which the following is a full, clear, and exact description.

The object of the invention is to provide a new and improved process for treating feldspar, feldspathic rock and like material with a view to obtain a potash fertilizer and valuable by-products at a comparatively low cost.

In order to obtain the desired result, the material, in lump or other form, is burned at a low red heat (about 800° centigrade) for about two hours in a suitable furnace, and then the burnt material is suddenly cooled, preferably by the use of water, to chill the material. The chilled material is next reduced by a suitable crusher to about 40 mesh and is then mixed in a suitable mixing apparatus with anhydrous calcium chlorid, after which the mixture is fused in the presence of air.

In practice, I have found that a good result is obtained by mixing 100 parts of the material with about 30 or more parts of anhydrous calcium chlorid. The reaction which takes place is represented by the following formula:

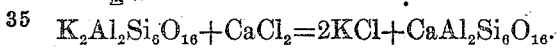

$$K_2Al_2Si_6O_{16} + CaCl_2 = 2KCl + CaAl_2Si_6O_{16}.$$

The fused mass is next powdered to, at least, 60 mesh.

When it is desired to use the resultant product directly as a potash fertilizer then the fusing is accomplished under a yellow heat (1200° to 1400° centigrade) in an ordinary furnace, it being understood that the fertilizer produced contains all the potash in the water soluble state. Chlorin gas, respectively, chlorin water or sodium hypochlorite solution is obtained as a by-product. When it is desired to extract potash salts, the fusing process is accomplished under a white heat (1800° centigrade and over) in the presence of air and preferably in an electric furnace. In this case the chlorid of potash volatilizes and is caught either in a cooling chamber or in water. Chlorin gas or chlorin water or sodium hypochlorite solution and a clinker are obtained as by-products. The clinker may be used in the manufacture of cement.

It is understood that by first heating the material and then suddenly cooling it, the material is disintegrated by the heat and held in this loosened condition by the sudden cooling, so that the material can be readily reduced and a thorough mixture formed with the calcium chlorid to allow proper subsequent fusing.

Having thus described my invention, I claim as new and desire to secure by Letters Patent:

1. The process of treating feldspar, feldspathic rock and like material, which consists in burning the material at a low red heat, then suddenly cooling the heated material, then mixing the cooled material with anhydrous calcium chlorid and then fusing the mixture at a temperature of at least 1200° centigrade and in the presence of air.

2. The process of treating feldspar, feldspathic rock and like material which consists in burning the material at a low red heat, then suddenly cooling the heated material, then mixing the cooled material with anhydrous calcium chlorid, and then fusing the mixture at a temperature of between 1200° and 1800° centigrade.

In testimony whereof I have signed my name to this specification in the presence of two subscribing witnesses.

WALTER GLAESER.

Witnesses:
 THEO. HUMAN, Jr.,
 BESSIE E. COHN.

Copies of this patent may be obtained for five cents each, by addressing the "Commissioner of Patents, Washington, D. C."